Nov. 24, 1925.

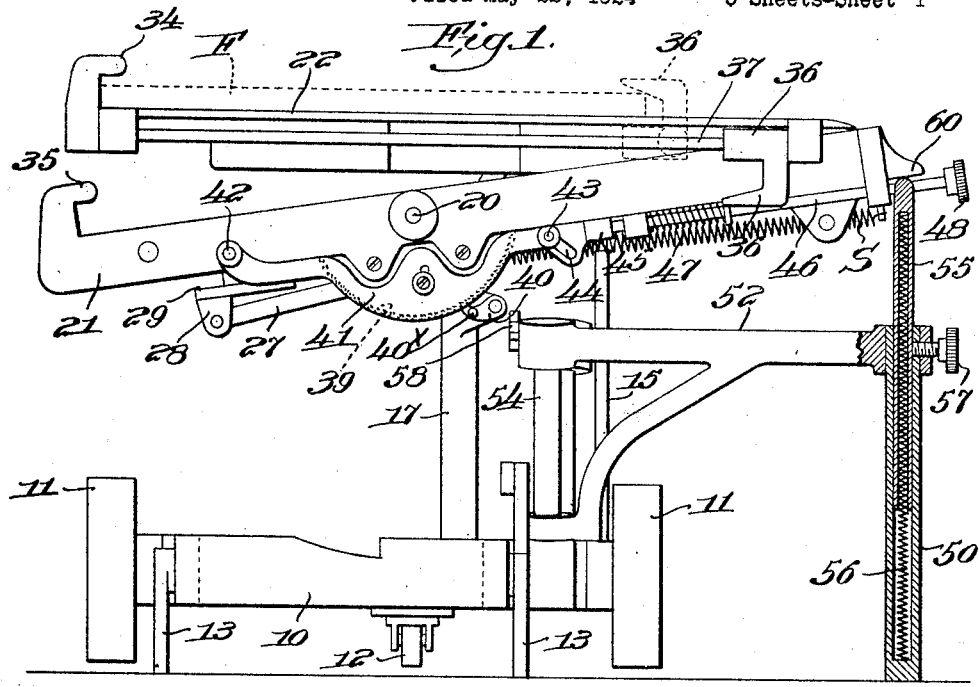

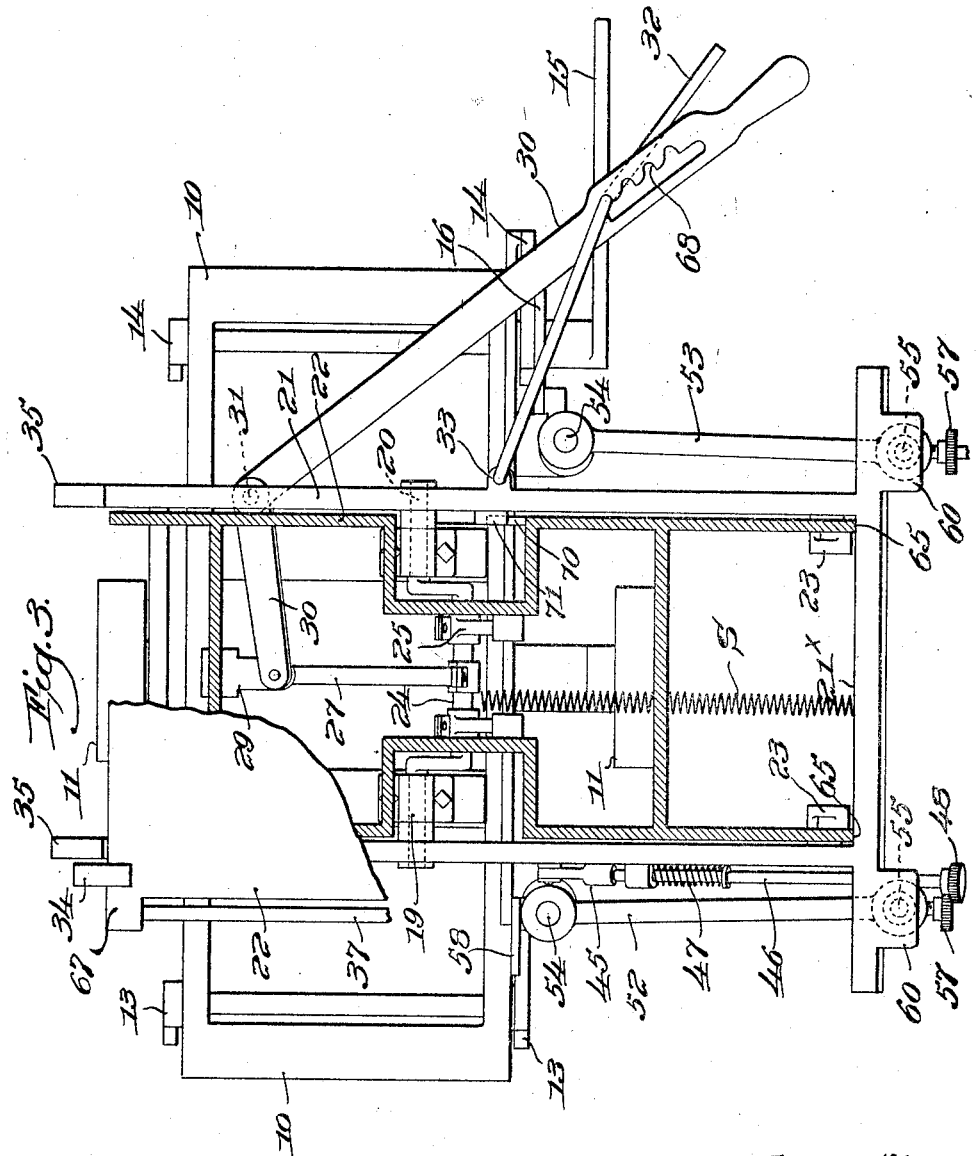

J. J. FLOYD

TRUCK

Filed May 22, 1924

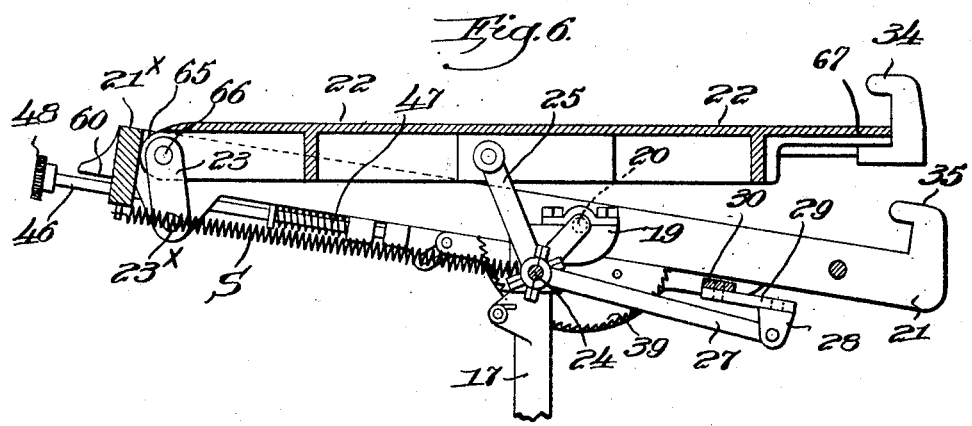
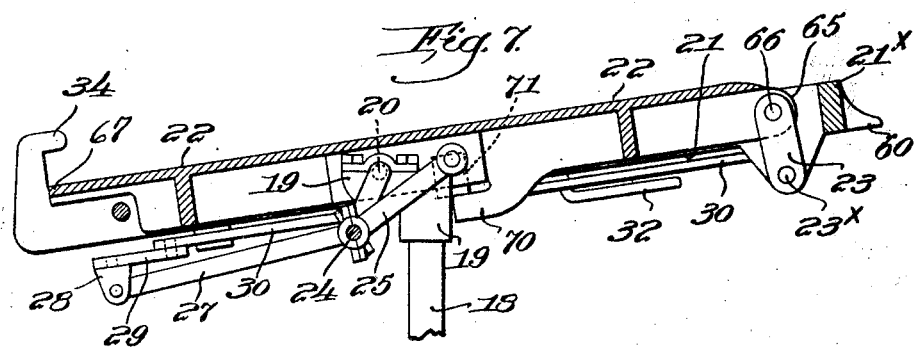
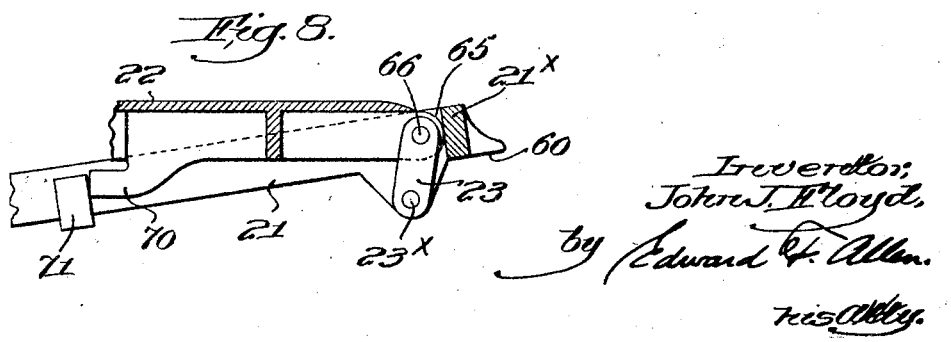

Patented Nov. 24, 1925.

1,562,750

UNITED STATES PATENT OFFICE.

JOHN J. FLOYD, OF MALDEN, MASSACHUSETTS.

TRUCK.

Application filed May 22, 1924. Serial No. 715,239.

*To all whom it may concern:*

Be it known that I, JOHN J. FLOYD, a citizen of the United States of America, and a resident of Malden, in the county of Middlesex and Commonwealth of Massachusetts, have invented certain new and useful Improvements in Trucks, of which the following is a specification.

This invention relates to a truck and more particularly to a truck adapted for use in the printing trade wherein type forms of considerable size and weight are frequently moved from place to place, which operation has heretofore required the services of two workmen and a crude truck or conveyance.

An object of the invention is to provide a truck of this class that may be loaded and unloaded by one workman in a rapid and energy saving manner and with safety to the type forms being handled.

A further object of the invention is to so construct a truck of this class that it may be made to function as a stationary table or platform while receiving or delivering a type form, and which may be rapidly made to function as a rolling conveyance when required.

A still further object of the invention is to so construct and arrange the form receiving platform that it may be rapidly adjusted to accommodate it to the height of a form receiving or delivery point such as a make-up stone, and which may be swung into an approximately vertical position for the reception or delivery of type forms from or to floor racks such as are commonly used in printing establishments.

Another object of the invention is to so arrange the form receiving platform that the major portion of the weight of the type form mounted thereon is borne by the truck frame during the transporting operation, or when the said platform is in an approximately vertical position.

It is also an object of the invention to so construct and arrange a truck of this class that a form placed thereon may be locked thereto and the weight thereof positioned to the best advantage for the transporting operation.

To the attainment of the above objects the invention consists in certain novel features of construction and arrangement of parts which will be readily understood by reference to the description of the drawings and to the claims hereinafter given.

For the purpose of illustrating the invention, one preferred form thereof is illustrated in the drawings, this form having been found to give satisfactory and reliable results, although it is to be understood that the various instrumentalities of which the invention consists can be variously arranged and organized, and that the invention is not limited to the precise arrangements and organizations of the instrumentalities herein shown and described, except as required by the scope of the appended claims.

Of the drawings:

Figure 1 represents an end view of the truck in one of the many positions it may be made to assume when about to receive or deliver a type form.

Figure 2 is a view looking toward the left Figure 1.

Figure 3 is a top plan view having a portion of the form receiving table or platform broken away for clearness.

Figure 6 is a section on the line 6—6 Figure 2.

Figure 7 is a section on the line 7—7 Figure 2.

Figure 8 is a detail of a locking means to be described.

Like characters represent like parts throughout the several figures of the drawings.

Figure 4:
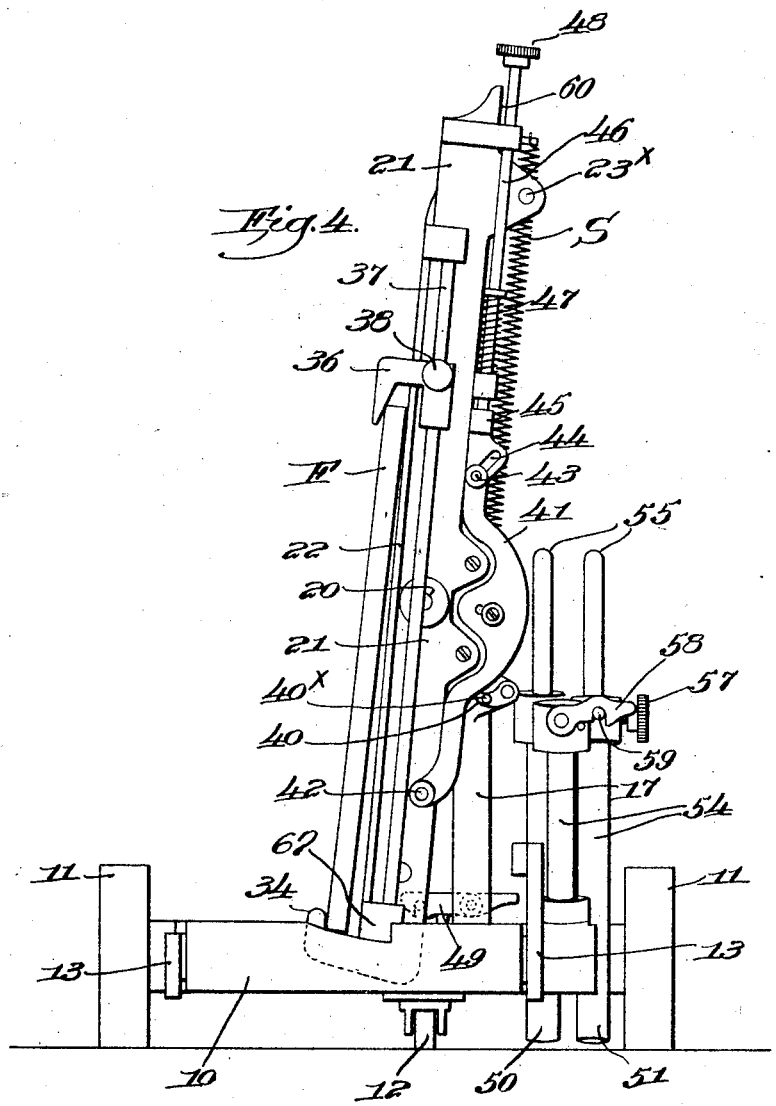
Figure 4 is a view similar to Figure 1 but showing the form receiving platform or table with a form secured thereon, and the truck otherwise ready to be moved.

Referring to the drawings:

The drawings herewith represent the invention as applied to a truck particularly intended for use in a printing establishment wherein type forms are required to be moved from one place to another, but it will be understood that changes might be made therein to fit it for other uses without departing from the spirit and scope of the invention.

The truck frame 10 having two sets of wheels 11 and 12 is also provided with frame elevating levers 13 and 14 under the control of a hand lever 15, said lever being adapted to at all times elevate the truck sufficiently to remove the said wheels from contact with the floor, and when the said levers are locked by the latch 16 with the wheels in the said position, the truck becomes substantially immovable, particularly against accidental movement when loading or unloading.

The frame 10 has uprights 17 and 18 which have bearings 19 at the tops thereof for trunnions 20 of a table carrying frame 21 to which is pivotally mounted the table 22 by means of links 23.

The trunnions 20 are in reality extensions of a crank shaft 24 which carries the links 25 pivotally connected to the table 22, and the link 27 pivoted to a block 28 which in turn is swiveled to the short link 29 pivoted to the short arm of the bell crank lever 30.

The bell crank 30 is pivoted to the frame 21 at 31 and has a lever 32 pivoted at 33 adapted to coact therewith to lock it in a given position.

The table 22 and the frame 21 each have hooks 34 and 35 respectively to receive a form F, while the table 22 also has other hooks 36 adapted to slide on rods 37 and to be secured to said rods by set screws 38, and when not in use these hooks 36 will be swung downwardly out of the way of an oncoming or off going type form or chase as shown by full lines Figure 1.

Fast to the frame 21 is a ratchet segment 39 which is normally engaged by a pawl 40 pivotally attached under spring control with the upright 17.

A segmental shoe 41 adapted to at times cause the pawl 40 to be disengaged from the ratchet 39, is pivoted at 42 to the frame 21 and has a stud 43 extending therefrom and entering an inclined slot 44 of a head 45 fast on the rod 46 which is slidingly mounted on the frame 21 and under the control of a spring 47, and has a knob 48 adapted to be hand pressed when it is desired to disengage the said pawl 40 from the ratchet 39.

To retain the table 22 and its carrier frame 21 in the position shown in Figure 4, a pawl 49 is suitably pivoted to the upright 18 and adapted to automatically engage a pin on the frame 21, and may be released therefrom by foot pressure when it is desired to swing the table and its carrier into the position shown in Figure 1 of the drawings.

To support the carrier and table as seen in Figures 1 and 2 legs 50 and 51 are provided, and comprising brackets 52 and 53 each of which is pivoted to an inclined stud 54, and adjustable extensions 55.

The legs 50 are tubes closed at the lower ends and fast with the brackets 52 and 53 and which have slidably mounted therein the tubular extension rods 55 between the upper ends of which and the lower ends of the legs 50 are interposed the springs 56 which tend to force the said extensions upwardly but may be restrained from so doing by the set screws 57.

Figure 5:
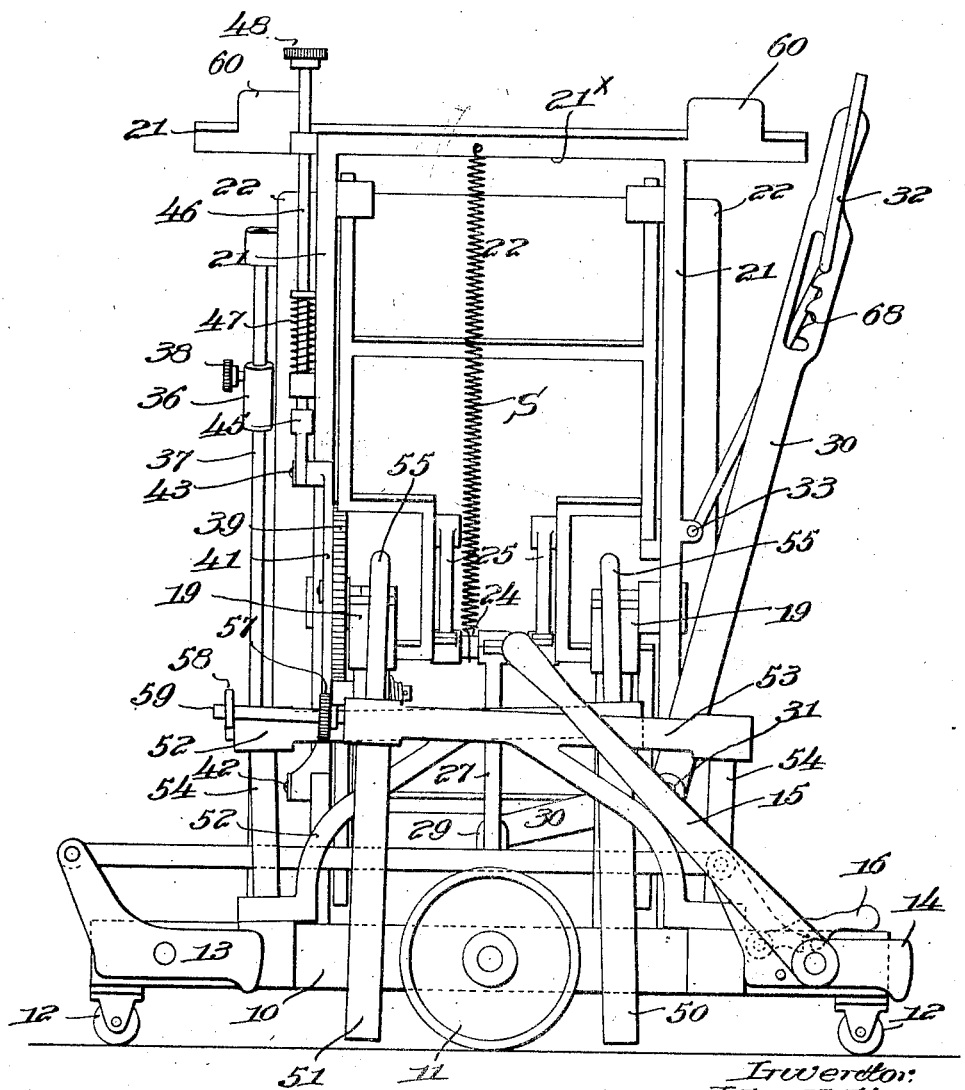
Figure 5 is a view looking toward the left Figure 4.

When the legs 50 and 51 are out of operation as seen in Figures 4 and 5 they are held from swinging outwardly by means of the latch 58 pivoted to the bracket 52 which automatically engages the pin 59 when the legs are positioned as seen in the said figures.

The studs 54 are oppositely inclined as seen in Figure 5 so that when the legs 50 and 51 are swung from the positions shown in Figures 1 and 2 to those of Figures 4 and 5, the said legs will be automatically raised from floor contact in order that the truck may be rolled.

When the said legs are swung outwardly the incline of the studs is such that the said legs will meet the floor during some part of their movement so that firm and equal support will be afforded the frame 21 and table 22 even though the floor upon which the truck rests may be uneven.

To operate the truck, let it be supposed that a form has been placed on it and moved to its destination, as for instance a floor rack, wherein the forms are placed on edge in the several compartments.

Having arrived with the rack with the truck in the condition shown in Figures 4 and 5 of the drawings, the latch 16 will be tripped to permit the hand lever 15 to be swung to the right to cause the elevating levers 14 to engage the floor and raise the truck until the wheels 11 and 12 are free from floor contact whereby the truck becomes substantially immovable.

The set screws 38 will now be released and the hooks or dogs 36 will be disengaged from the form F which is now ready to be slid off the truck into its place in the rack.

If however it is desired to deliver the form to a make-up stone, or to a press where it is to be placed face up, the truck will be elevated by the hand lever 15 as before explained, the latch 58 will be tripped and the legs 50 and 51 swung outwardly till they meet the floor.

The latch 49 will now be tripped to release the frame 21 which may be swung on its trunnions 20 till the bearing wings 60 meet the extension rods 55, which it will be supposed had been previously adjusted to approximately the height required, but may be further adjusted if necessary and secured in such position by the set screws 57.

If at this time the frame 21 and table 22 are approximately level and the table 22 at approximately the right height, no further adjustment thereof will be necessary, in which case the dogs will be released as before and the form slid off on to the make-up stone or press as the case may be.

On the other hand if the table 22 is not level but at this time assumes the position shown in Figure 7, and it is necessary to make it assume the position of Figure 6, the lever 30 will be forced outwardly, causing the links 29 and 27, through the block 28, to rock the shaft 24 and give longitudinal movement to the table 22 through the links 23 which will swing on their pivots 23× until the end of the table 65 meets the end strut 21× of the frame 21.

This last movement is sufficient to thereafter permit a pivotal movement of the table 22 about the pivots 66, as at that time the table end 67 is removed from under the hooks 35 and further rocking of the shaft 24 will cause the said table 22 to swing on the pivots 66 into the position shown in Figure 6, at which time the locking rod 32 may be made to engage one of the notches 68 of the lever 30 to thereby lock it in position against lowering movement of the table.

To prevent the table 22 from being swung on the pivots 66 before the end 65 meets the strut 21× of the frame 21, and to lock the said table against longitudinal movement while in the position of Figure 6, the following means is employed.

Fast to the table 22 is a hook like bunter 70 adapted to at times engage the under side or edge of a lug 71 when the table 22 and frame 21 are in the positions shown in Figures 1 and 7 thus holding them together and preventing swinging movement of the table until the longitudinal movement has been accomplished, at which time the bunter is freed from the under side of the lug and the table may then be swung.

After the table has been swung the said bunter will abut the side edge of the lug and thereby prevent retrograde longitudinal movement of the said table until such time as it has first been lowered so that the said bunter is free of the side edge and ready to engage the lower edge which is plainly illustrated in Figures 7 and 8 of the drawings.

To restore the truck to the position of Figure 4 from that of Figure 1, the locking rod 32 will be released from its notch in the lever 30, and said lever will be forced inwardly, causing the link 27 to rock the shaft 24 and swing the table on its pivots 66 until it finds its proper resting place and with the bunter 70 free from the side edge of the lug 71 and ready to engage the under edge thereof.

Further movement of the lever 30 at this time will cause the links 23 to swing on their pivots and give a longitudinal movement to the table 22, which movement will bring an edge of the chase, if on the table, under the hooks 35, and engagement of the bunter and under edge of the lug will take place and prevent accidental swinging of the table until the proper time.

The knob 48 will now be pressed which will cause the cam slot 44 to depress the pin 43 and swing the shoe 41 on its pivot 42, which action forces the pawl 40 out of engagement with the ratchet 39 by reason of the shoe 41 striking the pin 40× of the pawl 40.

The frame and table may now be swung into the position shown in Figure 4 at which time the latch 49 will automatically engage its pin and lock the frame in that position.

The bracket 52 will now be swung toward the truck, and next the bracket 53, until the pin 59 is engaged by the latch 58 thus locking both brackets in the positions shown in Figure 5 of the drawings.

If at this time it is desired to roll the truck about the floor, the hand lever 15 will be moved from position shown in Figure 2 to that shown in Figure 5, after first having tripped the pawl 16, whereby the elevating levers will now resume the positions shown in Figure 5 with the wheels 11 and 12 in contact with the floor.

The lever 15 is so arranged that the brackets 52 and 53 cannot swing outwardly until the said lever has been moved to raise the truck, thereby providing a safety lock for the brackets and compelling the operator to first stop the truck and elevate it before swinging the table to receive or discharge a form.

As an aid to assist in the initial movements of the frame and table a spring S may be employed which also acts as a counter balance when a form is on the table when it is being lowered.

Having described the invention I claim:

1. A truck of the class described comprising a frame; wheels on said frame; a second frame mounted on said first frame; a crank shaft adapted to function as pivotal means for said second frame; a work table mounted on said second frame and movable relatively thereto; means to lock said second frame from pivotal movement; means coacting with said crank shaft whereby said table may be moved relatively to said second frame; and means to lock said table against said relative movement.

2. A truck of the class described comprising a frame; wheels on said frame; a second frame mounted on said first frame; a crank shaft about which said second frame may be pivotally swung; a work table mounted on said second frame; link connections between said second frame and said table; link connections between said crank shaft and said second frame; means coacting with said crank shaft whereby said table may be first moved longitudinally of said second frame and thereafter pivotally relatively thereto; and means to aid in the support of said frame in the various positions thereof.

3. A truck of the class described comprising a frame; wheels on said frame; a second frame pivotally mounted on said first frame; a crank shaft about which said second frame may be swung into approximately vertical and horizontal positions; means to lock said second frame in said vertical position; means to lock said second frame against retrograde movement when in said horizontal position and comprising ratchet and pawl engagement; means to disengage said pawl from said ratchet; a work table having pivotal link connection with said second frame; a lever adapted to initiate relative movement between said second frame and said table; link connections between said lever, said crank shaft and said table whereby said table may be moved relatively to said second frame; and means whereby said second frame and said table may be locked against movement.

4. In a truck of the class described, comprising a frame; wheels on said frame; a work table carried by said frame; means whereby said table may be positioned in approximately vertical and horizontal positions; legs so constructed and arranged as to be positioned in truck supporting position; and means normally collapsed but adapted to be arranged in supporting position and comprising members longitudinally adjustable whereby said table may be aided in its support in a desired horizontal position.

5. In a truck of the class described comprising a frame; wheels on said frame; a table carried by said frame; means whereby said table may be moved into approximate vertical and horizontal positions; means to aid in the support of said table when in a horizontal position and comprising brackets having inclined pivots therefor, legs extending from said brackets and adapted to contact with the floor when said brackets are swung into supporting position and out of floor contact when said brackets are swung into inoperative position, telescopic spring pressed rods in said legs, means to secure said rods in adjusted position, means to secure said brackets in inoperative position; means to remove said wheels from floor contact comprising a hand lever normally in position to prevent said brackets from being moved into operative position prior to the movement of said lever, and legs operatively connected to said lever and movable thereby into truck sustaining position; and means to lock said lever in inoperative position.

6. A truck of the class described comprising a frame; wheels on said frame; a second frame pivotally mounted on said first frame and arranged to be tilted into various angular positions and locked therein; means to lock said second frame in various angular positions; a work receiving table having link connections with said second frame; means to normally retain said table and said second frame in locked position; means to actuate said link connection to first unlock said table and said second frame and thereafter swing said table into the desired position; and means to lock said table in said last position.

7. A truck of the class described comprising a frame; wheels on said frame; a second frame mounted on said first frame; a work receiving table carried by said second frame; a shaft upon which said second frame is pivotally mounted; a crank on said shaft; links pivotally arranged on said second frame and to which said table is pivotally connected; a lock member carried by said second frame; a coacting hook member carried by said table; means whereby said shaft may be rocked to swing said links on their pivots whereby said lock members may be released from locking position and thereafter swing said table on pivots carried by said links, said lock members being so arranged as to form stop means to prevent movement of said links after said table has been swung; and means to lock said first means.

8. A truck of the class described comprising a frame; wheels on said frame; a second frame carried by said first frame; a shaft upon which said second frame is mounted; a ratchet mounted on said second frame; a pawl arranged to engage said ratchet whereby said second frame may be tilted at various angles and restrained from movement in one direction; a work receiving table longitudinally and pivotally mounted on said second frame by means of links; a crank on said shaft; means coacting with said shaft whereby said table may be moved first longitudinally and thereafter pivotally; and means to lock said table in a desired position.

9. A truck of the class described comprising a frame; wheels on said frame; a work receiving table carried by said frame and arranged to swing into approximate vertical and horizontal positions; means to aid in the support of said table when it is swung into a horizontal position, said means including longitudinally adjustable legs mounted in swinging brackets, said brackets being arranged to fold closely to said frame; means to elevate said frame and simultaneously raise said wheels from floor contact whereby said truck is restrained from movement during the transfer of work to or from said table, said last means being also arranged to prevent the positioning of said legs for use prior to elevating said frame.

10. A truck of the class described comprising a frame; wheels on said frame; a second frame pivotally arranged with respect to said first frame; a work receiving table longitudinally and pivotally arranged with respect to said second frame by means of links; a lock member fast with said second frame; a hook fast with said table and arranged to engage said lock member to prevent pivotal movement of said table at certain times, said lock member and said hook being arranged to abut at certain times to prevent longitudinal movement of said table; and means to actuate said links.

Signed by me at Boston, Mass., this 10th day of May, 1924.

JOHN J. FLOYD.